No. 895,157. PATENTED AUG. 4, 1908.
S. P. BUSH.
CAR TRUCK.
APPLICATION FILED APR. 25, 1907.

2 SHEETS—SHEET 1.

Witnesses
Carl Stoughton
F. G. Campbell

Inventor
Samuel Prescott Bush
By Chester C. Shepherd
Attorney

No. 895,157. PATENTED AUG. 4, 1908.
S. P. BUSH.
CAR TRUCK.
APPLICATION FILED APR. 25, 1907.
2 SHEETS—SHEET 2.
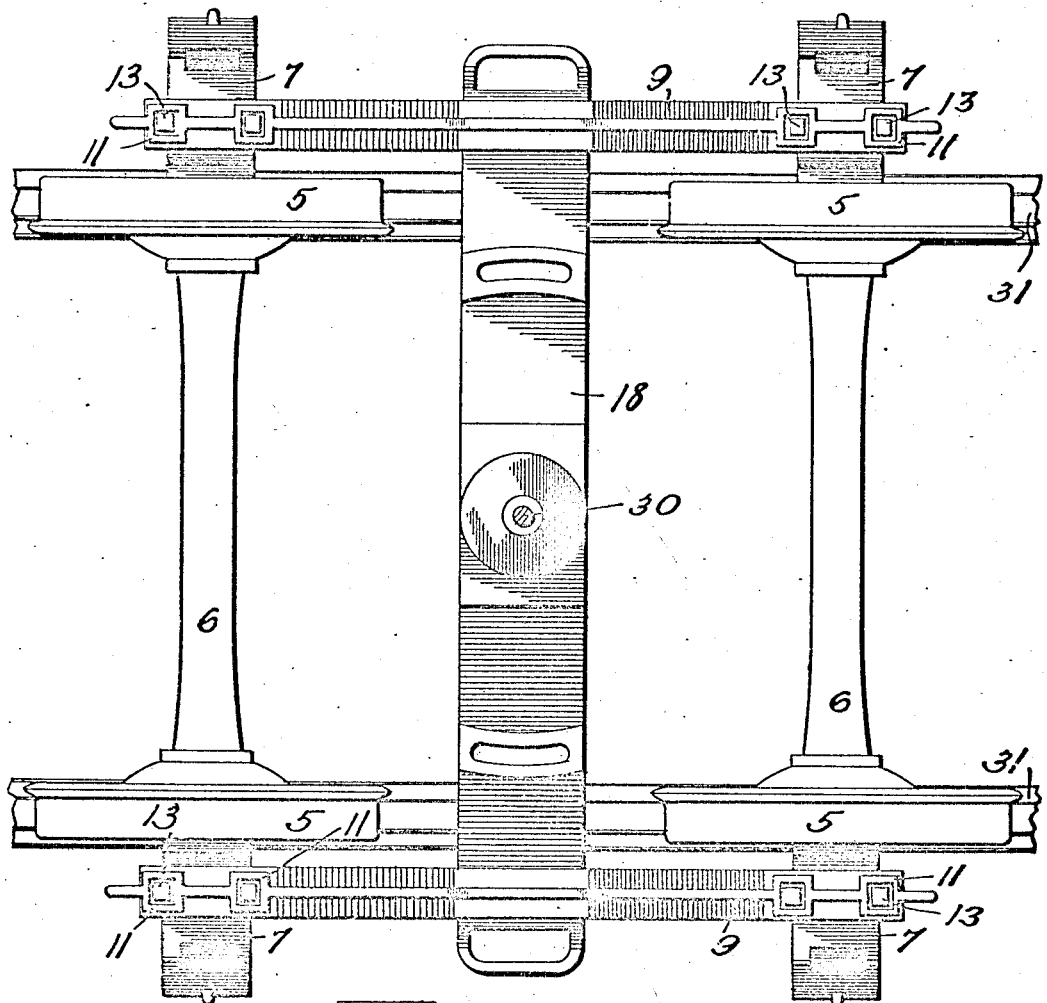
Fig. 3.
Fig. 4.
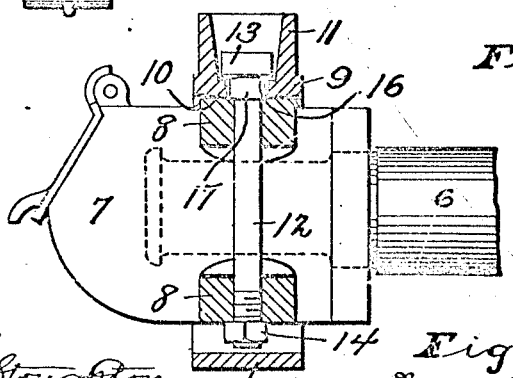
Witnesses
Carl Stoughton
F. G. Campbell
Inventor
Samuel Prescott Bush.
By Chester C. Shepherd
Attorney

UNITED STATES PATENT OFFICE.

SAMUEL PRESCOTT BUSH, OF COLUMBUS, OHIO.

CAR-TRUCK.

No. 895,157.  Specification of Letters Patent.  Patented Aug. 4, 1908.

Application filed April 25, 1907. Serial No. 370,122.

*To all whom it may concern:*

Be it known that I, SAMUEL PRESCOTT BUSH, a citizen of the United States, residing at Columbus, in the county of Franklin and State of Ohio, have invented certain new and useful Improvements in Car-Trucks, of which the following is a specification.

My invention relates to car trucks and has for its object the provision of a device of this character constructed in such manner that the body of a car supported thereby will be permitted a limited transverse bodily movement with relation to the wheels of the truck, and in addition thereto to provide spring bearings for the body of the car.

Further objects and advantages of the invention will be set forth in the detailed description which now follows.

Figure 1:
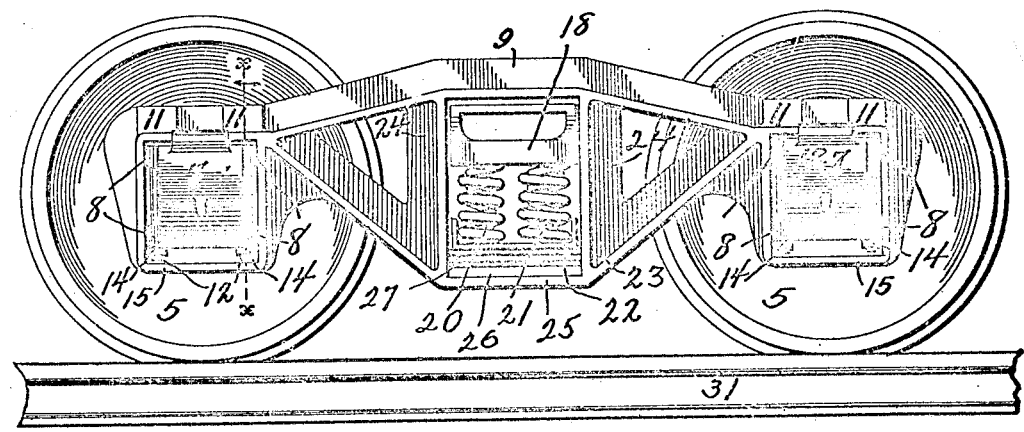
Figure 2:
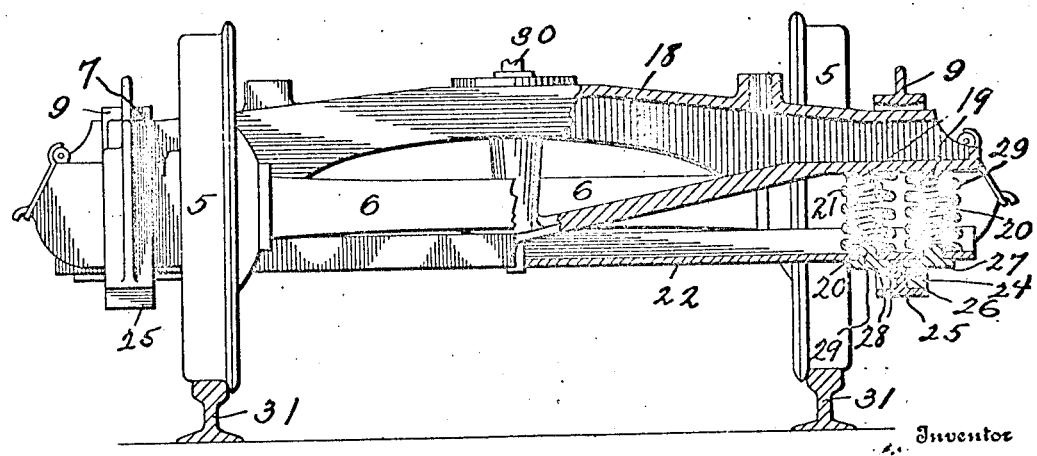

In the accompanying drawing: Figure 1 is a side elevation of a car truck constructed in accordance with the invention, Fig. 2 is an end view partially in section of said truck, Fig. 3 is a plan view of the truck, and, Fig. 4 is a detail sectional view upon line x—x of Fig. 1.

Like numerals designate corresponding parts in all of the figures of the drawing.

Referring to the drawing, the numerals 5 designate car wheels which are carried by axles 6, said wheels and axles being of the usual and well known construction. Mounted upon the ends of the axles 6 are journal boxes 7, said journal boxes likewise being of the usual construction and being provided with ears 8. The side members 9 of the trucks are mounted to rock upon the journal boxes, the under faces of that portion of the side members that bear upon the journal boxes being rounded or beveled off as at 10 and said side members having a plurality of sockets 11 cast integral therewith for the reception of bolts 12, the heads 13 of these bolts resting in the sockets and said bolts passing through the lugs 8 and having nuts 14 threaded upon their lower ends. It is to be understood that these bolts lie upon the outside of the journal boxes proper. The bottom straps 15 of those portions of the side members that surround the journal boxes lie a sufficient distance below the bottom of the journal boxes to clear the lower ends of the bolts 12 and the nuts 14, the side members having a bodily swinging lateral movement with relation to the journal boxes, said side members rocking upon the rounded or beveled surfaces 10 which rest upon the upper faces of the ears 8 and upon the tops of the journal boxes.

The bottoms of the sockets 11 are rounded as at 16, the heads of the bolt bearing against said rounded bottoms as is best illustrated in Fig. 4. It will therefore be seen that these bolts hold the side members in position and hold them firmly against vertical movement, but permit them to rock. There is, however, no undue friction exerted by the heads of the bolts upon the rounded bottoms 16 of the sockets 11 for the bolts are provided with shoulders 17, said shoulders bearing against the upper faces of the ears 8 and limiting the downward movement of the bolts.

A centrally disposed steel bolster 18 is adapted to have the end bolster, not shown, of a car, pivoted thereto in the usual and well known manner. This bolster carries lugs 19 which enter the open ends of springs 20. The springs 20 are in turn surrounded by heavier springs 21, the lower ends of all of said springs bearing upon a spring plank 22. This spring plank 22 passes through a stirrup 23 formed by vertical ribs 24 and a horizontal rib 25. This horizontal rib carries a T-rail 26 (see Fig. 2) and upon this T-rail rests a bearing plate 27. Lugs 28 carried by said bearing plate limit the transverse movement of said plate with relation to the T-rail. Lugs 29 carried by the plate 27, project through the spring plank 22 and enter the lower open ends of the springs 20. By referring to Fig. 1, it will be seen that the spring plank is of inverted U-shape in cross section. It is to be understood that the structure just described is duplicated at both ends of the bolster 18.

The operation of the device is as follows: The springs 20 and 21 provide a spring bearing for the bolster 18 and consequently for the body of the car. A portion of the king bolt that pivots the end bolster of the car, not shown, to the bolster 18 has been indicated at 30. The lower end of this king bolt passes through the spring plank 22. Any transverse movement of the bolster will consequently be imparted to the spring plank, so that the spring plank and the bolster will move bodily together to prevent the springs 20 and 21 being thrown out of vertical alinement. When, in rounding curves, the bolster 18 tends to move bodily in a transverse direction with relation to the rails 31, a limited transverse movement of this character will be possible by virtue of the fact that the bolster 18 which of course supports the entire weight of the car, rests upon the T-rail 26. Movement of the bolster to the right for instance in Fig. 2, would throw this T-rail bodily over to the right and tilt the side members 9, said side members rocking as has been hereinbefore set forth, upon their rounded surfaces 10.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is:

1. In a truck, the combination with the journal boxes, of side frames having a lateral swinging motion and having their bearings on the journal boxes, and a transverse member adapted to have a car body pivoted thereto, said transverse member connecting the side frames.

2. In a truck, the combination with the journal boxes, of side frames having a lateral swinging motion and having their bearings on the journal boxes, and a yielding transverse member adapted to have a car body pivoted thereto, said yielding transverse member connecting the side frames.

3. In a truck, the combination with the journal boxes, of side frames having a lateral swinging motion, said side frames having their bearings on the journal boxes, a transverse member connecting said side frames, a bolster, and springs interposed between said bolster and said transverse member.

4. In a truck, the combination with journal boxes, of side frames having their bearings on the journal boxes, said frames being capable of a lateral swinging motion with relation to said journal boxes, a bolster capable of independent vertical movement with relation to the side frames, and means for imparting the horizontal movements of the bolster to the side frames.

5. In a truck, the combination with journal boxes, of side frames adapted to swing laterally with relation to said journal boxes, said side frames having bearings at the center, and a bolster adapted to move laterally and supported by said central bearings.

6. In a truck, the combination with journal boxes supported by the axles of said truck, of a pair of side frames bearing upon the upper faces of said journal boxes and adapted to be rocked thereon, a transverse member connecting said side frames at approximately their central portions, a bolster, and springs interposed between said bolster and said transverse member.

7. In a truck, the combination with journal boxes supported by the axles of said truck, of a pair of side frames bearing upon the upper faces of said journal boxes and adapted to be rocked thereon, a transverse member connecting said side frames at approximately their central portions, a bolster, springs interposed between said bolster and said transverse member, and means for preventing vertical movement of the side frames with relation to the journal boxes.

8. In a truck, the combination with the journal boxes, of a side frame having open portions adapted to surround said journal boxes and having rounded faces adapted to rest upon the upper faces of the journal boxes, and bolts passing through portions of said frames and adapted to hold said frames in engagement with the journal boxes, but said bolts permitting the frames to rock with relation to the journal boxes.

In testimony whereof I affix my signature in presence of two witnesses.

SAMUEL PRESCOTT BUSH.

Witnesses:
  JOHN H. McCORMICK,
  T. V. TAYLOR.